United States Patent [19]

Hicks

[11] 4,225,479

[45] Sep. 30, 1980

[54] CATIONIC EPOXIDE-AMINE REACTION PRODUCTS

[75] Inventor: Darrell D. Hicks, Jeffersontown, Ky.

[73] Assignee: Celanese Corporation, New York, N.Y.

[21] Appl. No.: 62,439

[22] Filed: Jul. 30, 1979

Related U.S. Application Data

[60] Division of Ser. No. 947,376, Oct. 2, 1978, which is a continuation-in-part of Ser. No. 858,134, Dec. 7, 1977, abandoned.

[51] Int. Cl.$^2$ .................. C08L 63/00; C08L 63/02; C09D 3/56; C09D 3/58
[52] U.S. Cl. .................. 260/29.2 TN; 260/18 EP; 260/18 TN; 260/19 EP; 260/21; 260/29.2 EP; 260/29.3; 260/29.4 R; 528/68; 528/120
[58] Field of Search ......... 260/18 EP, 18 TN, 19 EP, 260/21, 29.2 TN, 29.2 EP, 29.3, 29.4 R; 528/120, 68

[56] References Cited

U.S. PATENT DOCUMENTS

| | | | |
|---|---|---|---|
| 2,772,248 | 11/1956 | Lieberman et al. | 260/29.2 |
| 3,023,190 | 2/1962 | Damusis | 528/120 |
| 3,278,488 | 10/1966 | Nikles et al. | 528/99 |
| 3,336,253 | 8/1967 | Wong et al. | 260/29.2 |
| 3,367,991 | 2/1968 | Hicks | 260/21 X |
| 3,640,926 | 2/1972 | Slater et al. | 260/29.2 X |
| 3,709,847 | 1/1973 | Toepfl et al. | 260/18 |
| 3,719,626 | 3/1973 | May | 260/29.2 |
| 3,728,302 | 4/1973 | Helm | 260/37 |
| 3,801,348 | 4/1974 | Helm | 260/37 X |
| 3,947,338 | 3/1976 | Jerabek et al. | 204/181 |
| 3,954,762 | 5/1976 | Helm | 528/429 X |
| 4,093,594 | 6/1978 | Anderson | 260/29.2 X |
| 4,116,900 | 9/1978 | Belanger | 260/29.2 X |
| 4,134,864 | 1/1979 | Belanger | 260/29.2 X |
| 4,137,140 | 1/1979 | Belanger | 204/181 |
| 4,139,510 | 2/1979 | Anderson | 260/18 |

FOREIGN PATENT DOCUMENTS

2426996 12/1974 Fed. Rep. of Germany.

OTHER PUBLICATIONS

Lee, Handbook of Epoxy Resins, 1967, 7-27 to 7-30, 13-7 to 13-16, 15-11 and 24-24 to 24-25.
May, Epoxy Resins, 1973, pp. 416-417.

*Primary Examiner*—Howard E. Schain
*Attorney, Agent, or Firm*—Herbert P. Price; K. A. Genoni; T. J. Morgan

[57] ABSTRACT

Polyepoxide resins are reacted in approximately equivalent ratios with primary amines to form cationic resinous compositions. The primary amine is a mixture of an aliphatic monoamine and an aliphatic diamine which contains one primary amine group and one tertiary amine group. The resinous reaction products can be salted with an acid and can be dissolved or dispersed in water. The aqueous dispersions or solutions can then be formulated into primer coatings for metal objects.

4 Claims, No Drawings

CATIONIC EPOXIDE-AMINE REACTION PRODUCTS

CROSS-REFERENCES TO RELATED APPLICATIONS

This is a division of application, Ser. No. 947,376, filed Oct. 2, 1978, which is a continuation-in-part of application, Ser. No. 858,134, filed Dec. 7, 1977 (now abandoned).

BACKGROUND OF THE INVENTION

The field of art to which this invention pertains is synthetic resins containing a hydrophilic group, said resins being soluble or dispersible in water when salted.

Industrial coating processes utilizing aqueous dispersions or solutions of organic resinous film forming compositions continue to grow in importance. The aqueous coating compositions are used in various applications, such as spray coating, flow coating and electrodeposition coating processes. Particularly useful organic resinous film forming compositions are cationic compositions which, primarily, are used in primer paints for metals. Such cationic compositions which contain amine nitrogen groups have superior corrosion resistance when formulated into primer paints.

The coating of electrically conductive substrates by electrodeposition is an important industrial process. In this process, a conductive article is immersed as one electrode in a coating composition made from an aqueous dispersion of film-forming polymer. An electric current is passed between the article and a counterelectrode in electrical contact with the aqueous dispersion until a desired coating is produced on the article. The article to be coated can be made the anode or the cathode depending upon the ionic nature of the coating system.

There are certain disadvantages in anodic deposition processes. Anodic deposition of ferrous metals tends to discolor the electrodeposited film and phosphate conversion coatings, which are commonly applied to a metal surface before an organic coating composition is deposited thereon, tend to be stripped from the metal under anodic deposition conditions. In addition, it is a peculiarity of anodic electrodeposition coating methods that nascent oxygen is produced at the anode which can react with the resinous coating composition to produce bubbles or voids in the deposited coatings.

The use of cathodic electrodepositable compositions tends to alleviate the discoloration problems and to give improved resistance properties. Although nascent hydrogen develops at the cathode during the electrodeposition process, no metal ions pass into the coating solution or are present in the deposited film. Generally, the amount of nascent hydrogen produced at the cathode does not have the same deleterious effect on the properties of the deposited film as does the nascent oxygen produced during anodic deposition.

Cationic coating compositions generally are derived from resinous compositions containing a basic nitrogen atom which can be salted with an acid and then be dissolved or dispersed in water. Sufficient basic nitrogen atoms should be present so that dispersibility or solubility can be obtained with a minimum amount of acid. If the coating bath is very acidic, considerable corrosion problems with the metal tanks, piping systems and other equipment are encountered.

SUMMARY OF THE INVENTION

This invention pertains to resinous compositions. In particular this invention relates to cationic resinous coating compositions. More particularly, this invention pertains to cationic resinous coating compositions which when salted with an acid are dispersible or soluble in water.

The soluble and fusible resinous composition of this invention is made from a polyepoxide resin and a mixture of primary amines. The polyepoxide resin is derived from a diol and an epihalohydrin and has a 1,2-epoxide equivalent weight of about 150 to about 300. One of the primary amines of the mixture is an aliphatic monoamine containing about 8 to about 18 carbon atoms, one primary amine group and no other groups which are reactive with epoxide groups under the conditions of the reaction. The other primary amine is an aliphatic diamine which contains one primary amine group and one tertiary amine group and no other groups reactive with epoxide groups. The amines in the mixture are within the mol ratios of about 2:1 aliphatic monoamine:aliphatic diamine to about 1:3 aliphatic monoamine:aliphatic diamine. In the composition, the polyepoxide resin and the primary amine mixture are reacted in the mol ratio of about 10:9 to 9:10.

The resinous compositions of this invention contain tertiary amine groups within the polymeric chain as well as pendant tertiary amine groups. The compositions also contain aliphatic hydroxyl groups which can be present in the starting polyepoxide resin and which are formed when the primary amines react with the epoxide groups. Upon partial salting with an acid, the resins are readily dissolved or dispersed in water. Such aqueous compositions can be formulated into coating compositions which are particularly useful as primers for metals.

DESCRIPTION OF THE INVENTION

The compositions of this invention are the reaction products of polyepoxide resins and primary amines. The linkage formed from the reaction of the epoxide group and the amine group can be represented by the skeletal formula

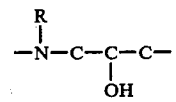

wherein R is a hydrocarbon group. The nitrogen atom is tertiary amine group and can be salted with an acid. The OH group is available for crosslinking reactions.

The polyepoxide resins useful in this invention are glycidyl polyethers of polyhydric phenols and polyhydric alcohols and contain more than one up to two 1,2-epoxide groups per molecule. Such polyepoxide resins are derived from a dihydric phenol or a dihydric alcohol and an epihalohydrin and have an epoxide equivalent weight of about 150 to about 300. Examples of epihalohydrins are epichlorohydrin, epibromohydrin and epiiodohydrin with epichlorohydrin being preferred. Dihydric phenols and dihydric alcohols are exemplified by resorcinol, hydroquinone, p,p-dihydroxyphenyl propane (or Bisphenol A as it is commonly called), p,p-dihydroxybenzophenone, p,p'-dihydroxy diphenyl, p,p-dihydroxydiphenyl ethane, bis(2-hydroxynaphthyl)-methane, 1,5-dihydroxynaphthalene, ethylene glycol, propylene glycol, 1,4-butanediol, hydrogenated Bisphenol A, 1,4-cyclohexanediol, 1,3-cyclopentanediol, cyclohexane dimethanol and the like. These polyepoxide resins are well known in the art and are made in the desired molecular weights by reacting the epihalohydrin and the diol in various ratios. Preferably, the polyepoxide resins are made by reacting the epihalohydrin in an amount at least equal to the hydroxyl groups and, most preferably, in excess. Preferred polyepoxide resins are the glycidyl polyethers of Bisphenol A having an epoxide equivalent weight of about 170 to about 200. As used in this invention one mol of the polyepoxide resin is considered to have a molecular weight which is twice the epoxide equivalent weight.

The amines used in this invention are a mixture of aliphatic monoamines which contain one primary amine group per molecule and aliphatic diamines which contain one primary amine group and one tertiary amine group per molecule. The aliphatic monoamines contain about 8 to about 18 carbon atoms, only one amine group, a primary amine group, and no other groups which are reactive with epoxide groups under the reaction conditions. Examples of such amines are 2-ethylhexylamine, 2,4-diisopropylhexylamine, nonylamine, decylamine, dodecylamine, hexadecylamine, and octadecylamine. Also included are the fatty amines which are named after the fatty acids from which they are derived, e.g., laurylamine, myristylamine, palmitylamine, stearylamine, oleylamine, linoleylamine and linolenylamine. Fatty amines also include mixture of such amines which are derived from corresponding mixed fatty acids and are named after the naturally occurring oils and waxes from which they are derived, e.g., cocoanut amine, tallow amine, hydrogenated tallow amine and soya amine. The preferred aliphatic monoamines are those amines which contain about 12 to about 16 carbon atoms per molecule.

The aliphatic diamines contain only one primary amine group and only one tertiary amine group and no other groups which are reactive with epoxide groups. These diamines can be represented by the formula

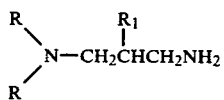

wherein each R is an alkyl group which contains 2 to 6 carbon atoms and $R_1$ is hydrogen or an alkyl group which contains one or 2 carbon atoms. The preferred diamine is 3-diethylaminopropylamine.

The monoamine and the diamine are present in the mixture in the molar ratio of about 2 mols of monoamine to one mol of diamine to about one mol of monoamine to 3 mols of diamine. Preferred ratios are equimolar amounts of the two amines as well as 1 mol of the monoamine and 3 mols of the diamine.

In preparing the compositions of this invention, the reaction of the primary amine mixture and the polyepoxide resin is conducted in approximately equivalent ratios, i.e., in a molar ratio of about 10:9 to about 9:10 and, preferably, in a molar ratio of 1:1. As used in this invention, the molar ratio is actually the equivalent ratio, i.e., a molar ratio of 1:1 is intended to mean one epoxide group is reacted per each active amine hydrogen atom.

As set forth hereinbefore, the primary amines used in the process of this invention are a mixture of long chain monoprimary amines and diamines which contain one primary amine group and one tertiary amine group. If all monoprimary amine is used, the resulting resinous products require a high equivalence of acid to form salts which can be dispersed in water. The aqueous baths of these salts have low pH's which are undesirable because of corrosion problems. If all diamine is used, the resins can be readily dispersed in water with low equivalent amounts of acid, and, therefore, practically neutral baths. However, such products do not have sufficient flexibility, corrosion resistance, and insulation properties to make good primers. It has been found that a molar mixture of monoamine to diamine of 2:1 to 1:3 gives a good balance of properties.

Normally, the reaction of two difunctional compounds results in a linear polymer, e.g., polyesters formed from ethylene glycol and terephthalic acid. The reaction of a diepoxide and a primary amine, two difunctional compounds, should result in a linear polymer. However, under some conditions, such as when the two compounds are mixed together and heated to a reaction temperature, crosslinking and gel formation can occur. It is postulated that this gel formation results from the reaction of epoxy groups and the hydroxyl groups which are present in the epoxy resin or which result from the reaction of epoxy groups and amines. The epoxy-hydroxyl reaction is catalyzed by tertiary amine groups which are present in such amines as 3-diethylaminopropylamine or which are formed when a primary amine reacts with 2 epoxy groups. In order to minimize the epoxy-hydroxyl reaction and to prevent gel formation, the compositions of this invention are made by adding the polyepoxide resin to the amine mixture at the reaction temperature of about 50° C. to about 150° C. and, preferably, at about 75° C. to about 100° C. The rate of addition of the polyepoxide resin is such that there is substantially no build-up of epoxy groups which will be free to react with hydroxyl groups. This addition is so adjusted that it does not, substantially exceed the epoxy-amine reaction rate. Ideally, the addition rate is such that the epoxy group will react with a primary or formed secondary amine group as soon as it contacts the amine mixture. The time of addition will vary depending upon the reaction temperature, but generally will be from about 30 minutes to about 6 hours.

The reaction can be conducted in the absence of solvents. However, in view of the resinous nature of the products, it is preferred to conduct the reaction in an organic solvent. Any organic liquid which is a solvent for the reactants and reaction product can be used. Such solvents include hydrocarbons, ethers, alcohols, polyols, ether alcohols, and the like. Preferred solvents are water soluble solvents, e.g., alkylene glycol mono and diethers. The amount of solvent used can be any amount which is sufficient to render the reactants fluid at the reaction temperature. This amount of solvent will vary from about 0 to about 75 weight percent based on the total weight of the solution, and preferably 20 to 40 weight percent.

As stated hereinbefore, the resinous compositions of this invention are preferably made into aqueous coating compositions. In order to do this, it is necessary to add a neutralizing agent. Neutralization is accomplished by the salting of all or part of the amine groups by a water soluble organic or inorganic acid, e.g., formic acid, acetic acid, phosphoric acid, sulfuric acid, hydrochloric acid, and the like. A preferred acid is formic acid. The extent of neutralization depends upon the particular resin and it is only necessary that sufficient acid be added to solubilize or disperse the resin.

Aqueous coating compositions made from the resinous compositions of this invention can have a pH of about 3 to about 10, but preferably the pH will be about 5.0 to about 7.5 and, most preferably, about 6 to about 7. The amount of acid will vary from about 0.2 to about 1 equivalent for each amine nitrogen equivalent in the resin, but, preferably, about 0.25 to about 0.7 equivalent and, most preferably about 0.3 to about 0.4 equivalent of formic acid. If the pH is too low, corrosion of equipment is a problem. Electrocoating baths with low pH's have high conductivity which causes the utilization of more current. More gassing occurs at the cathode causing rough coatings. The coatings have lower rupture voltage and the throwing power (the ability to coat protected areas) is decreased. If the pH is high, the resin, generally, is difficult to dissolve or disperse and the resulting solution or dispersion is unstable. A pH close to neutral is preferred in order to obtain the best balance of coating properties and bath stability.

The resinous composition of this invention, when made into a coating composition, will be cured with a crosslinking agent. Such crosslinking agents are aminoplast resins, phenolplast resins and blocked polyisocyanates. Suitable aminoplast resins are the reaction products of ureas and melamines with aldehydes further etherified in some cases with an alcohol. Examples of aminoplast resin components are urea, ethylene urea, thiourea, melamine, benzoguanamine and acetoguanamine. Aldehydes useful in this invention are formaldehyde, acetaldehyde and propionaldehyde. The aminoplast resins can be used in the alkylol form but, preferably, are utilized in the ether form wherein the etherifying agent is a monohydric alcohol containing from 1 to about 8 carbon atoms. Examples of suitable aminoplast resins are methylol urea, dimethoxymethylol urea, butylated polymeric urea-formaldehyde resins, hexamethoxymethyl melamine, methylated polymeric melamine-formaldehyde resins and butylated polymeric melamine-formaldehyde resins. Aminoplast resins and their methods of preparation are described in detail in "Encyclopedia of Polymer Science and Technology", Volume 2, pages 1–91. Interscience Publishers (1965), which is hereby incorporated by reference.

Phenolplast resins are the reaction products of phenols and aldehydes which contain reactive methylol groups. These compositions can be monomeric or polymeric in nature depending on the molar ratio of phenol to aldehyde used in the initial condensation reaction. Examples of phenols which can be used to make the phenolplast resins are phenol, o, m, or p-cresol, 2,4-xylenol, 3,4-xylenol, 2,5-xylenol, cardanol, p-tert-butylphenol, and the like. Aldehydes useful in this reaction are formaldehyde, acetaldehyde and propionaldehyde. Particularly useful phenolplast resins are polymethylol phenols wherein the phenolic group is etherified with an alkyl, e.g., methyl or ethyl, group. Phenolplast resins and their methods of preparation are described in detail in "Encyclopedia of Polymer Science and Technology", Volume 10, pages 1–68. Interscience Publishers (1969), which is hereby incorporated by reference.

The amount of aminoplast or phenolplast resin used with the resinous compositions of this invention is about 8 weight percent to about 30 weight percent of the total vehicle solids weight and, preferably, about 15 to about 20 weight percent.

Useful blocked polyisocyanates are those which are stable in the dispersion systems at ordinary room temperature and which react with the resinous product of this invention at elevated temperatures.

In the preparation of the blocked organic polyisocyanate, any suitable organic polyisocyanate can be used. Representative examples are the aliphatic compounds such as trimethylene, tetramethylene, pentamethylene, hexamethylene, 1,2-propylene, 1,2-butylene, 2,3-butylene and 1,3-butylene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, and 1,4-naphthalene diisocyanates; the aliphatic-aromatic compounds such as 4,4'-diphenylene methane, 2,4- or 2,6-tolylene, or mixtures thereof, 4,4'-toluidine and 1,4-xylylene diisocyanates; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2,4',5,5'-tetraisocyanate; the polymerized polyisocyanates such as tolylene diisocyanate dimers and trimers, polymethylenepolyphenylene polyisocyanates having NCO functionalities of 2 to 3, and the like.

In addition, the organic polyisocyanate can be prepolymer derived from a polyol such as glycols, e.g., ethylene glycol and propylene glycol, as well as other polyols such as glycerol, trimethylolpropane, hexanetriol, pentaerythritol, and the like, as well as mono-ethers, such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Especially useful polyether polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, tripentaerythritol, polypentaerythritol, sorbitol, methyl glucosides, sucrose and the like with alkylene oxides such as ethylene oxide, propylene oxide, their mixtures, and the like.

Any suitable aliphatic, cycloaliphatic, aromatic, alkyl monoalcohol and phenolic compound can be used as a blocking agent in the practice of the present invention, such as lower aliphatic alcohols, such as methyl, ethyl, chloroethyl, propyl, butyl, amyl, hexyl, heptyl, octyl, nonyl, 3,3,5-trimethylhexanol, decyl and lauryl alcohols, and the like; the aromatic-alkyl alcohols, such as phenylcarbinol, methylphenylcarbinol, ethylene glycol monoethyl ether, ethylene glycol monobutyl ether and the like; the phenolic compounds such as phenol itself, substituted phenols in which the substituents do not adversely affect the coating operations. Examples include cresol, nitrophenol, chlorophenol and t-butyl phenol. Additional blocking agents include tertiary hydroxy amines, such as diethylethanolamine and oximes, such as methylethyl ketoxime, acetone oxime and cyclohexanone oxime, and caprolactam.

The blocked polyisocyanate is formed by reacting a sufficient quantity of blocking agent with the organic polyisocyanate to insure that no free isocyanate groups are present.

The amount of blocked polyisocyanate used will vary from about 15 weight percent to about 40 weight percent based on the total vehicle solids weight and, preferably, about 20 weight percent to about 25 weight percent.

The aqueous coating compositions can also contain pigments, coupling solvents, anti-oxidants, surface-active agents and the like. The pigments are of the conventional type and are one or more of such pigments as iron oxides, lead oxides, strontium chromate, carbon black, titanium dioxide, talc, barium, sulfate, barium yellow, cadmium red, chromic green, lead silicate and the like. The amount of pigment used will vary from no pigment up to a pigment/binder ratio, by weight of 2:1, and preferably a pigment/binder ratio of about 1:1 to 1:4.

Coupling solvents are water soluble or partially water soluble organic solvents for the resinous vehicles used in this invention. Examples of such solvents are ethylene glycol monomethyl, ether, ethylene glycol monoethyl ether, ethylene glycol monobutyl ether, diethylene glycol monobutyl ether, ethanol, isopropanol, n-butanol and the like. These coupling solvents are used in the amounts of 0 up to about 5 weight percent of the total weight of the coating bath. The total bath solids are kept within the range, based on the total bath weight, of about 5 to about 20 weight percent and, preferably, about 12 to about 18 weight percent.

In utilizing the resin of this invention, in electrodeposition processes, the electrocoating bath is prepared in an insulated container with an anode submersed in the bath and the object to be coated as the cathode. A direct electric current is applied using a voltage of 200 to 300 volts for a time sufficient to obtain a coating of about 0.5 to 1 mil, i.e., about 1 to 5 minutes. The coated object is then removed from the bath, rinsed and baked at 150° to 250° C. for 10 to 30 minutes to obtain a cured coating.

When used as dip coating primers, the resinous composition, curing agents, pigments, acid and water are formulated to a solids content of about 25 weight percent to about 35 weight percent in a dip tank. Metal objects are passed through the tank, are allowed to drip to remove excess paint and are baked at about 150° C. to about 250° C. for about 10 to about 30 minutes.

The following examples will describe the invention in more detail. Parts and percentages are parts and percentages by weight unless otherwise designated.

EXAMPLE 1

To a suitable reactor were added 59.15 parts of 3-diethylaminopropylamine, 86 parts of n-dodecylamine and 50 parts of ethylene glycol monomethyl ether. Nitrogen gas was introduced into the flask, agitation was begun and heat was applied. When the temperature reached 85° C., slow addition of a solution of 354.9 parts of the diglycidyl ether of Bisphenol A having an epoxide equivalent weight of 195.6 in 164.3 parts of ethylene glycol monomethyl ether was begun. The addition was completed over a period of 2 hours and 13 minutes with the temperature rising to 106° C. Heating at 100° C. to 106° C. was continued for 3 hours and 36 minutes to ensure completeness of the amine-epoxide reaction.

The epoxy-amine reaction product solution (47.8 parts) was blended with 9 parts of a butylated melamine formaldehyde resin solution at 66.7% solids in a mixture of 87.3% ethylene glycol methyl ether and 12.7% butanol. The blend was slowly added with stirring to a solution of 0.97 part of formic acid (89% in water) and 102 parts of water heated to 70° C. The blend quickly dissolved to form a hazy solution. The solution was further diluted with 240.2 parts of water and cooled to room temperature. The solution, having a pH of 6.9, was then placed in an electrocoating tank. Steel panels were made the cathode in a direct electric circuit and were immersed in the solution. The panels were coated for 2 minutes at 100 volts. Other panels were coated for 1 minute at 200 volts. In both instances, the initial current was 0.9 ampere with rapid decrease to 0.1 ampere. After coating, the panels were rinsed with water and were baked at 190° C. for 30 minutes. The coatings were smooth continuous films with slight orange peel. The thickness was 0.3 mil and the pencil hardness was 4H. The coatings were unaffected by a 1 minute xylene spot test and passed 160 inch pound reverse impact test.

EXAMPLE 2

Using the same procedure described in Example 1, 362.4 parts of 3-diethylaminopropylamine and 526.8 parts of n-dodecylamine were reacted with 2110.8 parts of the diglycidyl ether of Bisphenol A having an epoxide equivalent weight of 189.3 in 1286 parts of ethylene glycol monomethyl ether.

The epoxy amine resinous product solution (42 parts) was blended with 12.5 parts of an 80% solution in ethylene glycol monomethyl ether acetate of a blocked polyisocyanate made from a polymethylene polyphenylisocyanate having an average functionality of 2.7 blocked with caprolactam on the basis of one mol of caprolactam per NCO equivalent of the polyisocyanate and 2.7 parts of ethylene glycol monomethyl ether This blend was slowly added with stirring to a solution at 70° C., of 0.88 part formic acid (89% in water) in 105 parts of water. The resulting dispersion was cooled to room temperature and it was diluted with an additional 240 parts of water. This solution which had a pH of 6.75, was placed in an electrocoating bath and steel panels were coated at the cathode of a direct electric circuit at 100 volts and at 200 volts for 1 minute. In both cases the initial current was about 1 ampere which dropped quickly to 0.1 ampere. The coated panels were removed from the bath, were rinsed with water, and were baked at 163° C. for 20 minutes. The coatings had a film thickness of 0.4–0.5 mil and a pencil hardness of 2H-3H. The films were continuous with subdued gloss. They were softened by 100 methylethyl ketone double rubs but recovered completely.

It is to be understood that the foregoing detailed description is given merely by way of illustration and that many variations may be made therein without departing from the spirit of the invention.

What is claimed:
1. An aqueous composition comprising a resinous composition salted with an acid and dissolved or dispersed in water, wherein the resinous composition is the reaction product of
   (A) polyepoxide resin derived from a dihydric phenol or a dihydric alcohol and an epihalohydrin, said polyepoxide resin having a 1,2-epoxide equivalent weight of about 150 to about 300; and
   (B) an amine mixture of
     (1) an aliphatic monoamine containing about 8 to about 18 carbon atoms, one primary amine group and no other groups reactive with epoxy groups, and

(2) an aliphatic diamine containing one primary amine group and one tertiary amine group and no other groups reactive with epoxide groups wherein the molar ratio of (1) and (2) in the mixture varies from about 2:1 to about 1:3, wherein A and B are reacted in the mol ratio of 10:9 to 9:10 and wherein A is added to B at a reaction temperature of about 50° C. to about 150° C. at an addition rate which does not substantially exceed the epoxy-amine reaction rate.

2. The aqueous composition of claim 1 plus a crosslinking agent.

3. The aqueous composition of claim 2 wherein the crosslinking agent is an aminoplast resin, a phenolplast resin, or a blocked polyisocyanate.

4. A primer plant composition comprising the composition of claim 2 plus pigments.